United States Patent
Tochtermann

(10) Patent No.: US 11,002,356 B2
(45) Date of Patent: May 11, 2021

(54) METHOD FOR CONTROLLING THE OIL LEVEL IN A GEARBOX, AND GEARBOX FOR CARRYING OUT SAID METHOD

(71) Applicant: AVL COMMERCIAL DRIVELINE & TRACTOR ENGINEERING GMBH, Steyr (AT)

(72) Inventor: Jürgen Tochtermann, Steyr (AT)

(73) Assignee: AVL Commercial Driveline & Tractor Engineering GmbH, Steyr (AT)

( * ) Notice: Subject to any disclaimer, the term of this patent is extended or adjusted under 35 U.S.C. 154(b) by 439 days.

(21) Appl. No.: 15/753,848

(22) PCT Filed: Aug. 16, 2016

(86) PCT No.: PCT/AT2016/050253
§ 371 (c)(1),
(2) Date: Feb. 20, 2018

(87) PCT Pub. No.: WO2017/027894
PCT Pub. Date: Feb. 23, 2017

(65) Prior Publication Data
US 2019/0011036 A1    Jan. 10, 2019

(30) Foreign Application Priority Data
Aug. 19, 2015  (AT) .................................. A 548/2015

(51) Int. Cl.
*F16H 57/04* (2010.01)
*F16H 57/037* (2012.01)

(52) U.S. Cl.
CPC ..... *F16H 57/0447* (2013.01); *F16H 57/0435* (2013.01); *F16H 57/037* (2013.01)

(58) Field of Classification Search
CPC . F16H 57/0447; F16H 57/0455; F16H 57/037
See application file for complete search history.

(56) References Cited

U.S. PATENT DOCUMENTS 4,915,193 A    4/1990  Marquart
5,669,479 A *  9/1997  Matsufuji ........... F16D 48/0206
                                                    192/85.63
(Continued)

FOREIGN PATENT DOCUMENTS

DE   102009045426   4/2011
WO   2008108720    9/2008

OTHER PUBLICATIONS

English Abstract of DE102009045426.
English Abstract of WO2008108720.

*Primary Examiner* — Michael R Mansen
*Assistant Examiner* — Robert T Reese
(74) *Attorney, Agent, or Firm* — Dykema Gossett PLLC

(57) ABSTRACT

The invention relates to a method for controlling the oil level (h3) in a differential gearbox for a vehicle having an oil sump (3) and an oil reservoir (4) that is pneumatically separated from the oil sump (3). The oil reservoir (4) is connected to the oil sump (3) by way of at least one oil channel (34), and the oil sump (3) is connected to a pneumatic pressure source (8) by way of at least one control valve (7) and an air line (5), wherein in at least one position (B) of the of a the control valve (7), the pressure source (8) is pneumatically connected to the oil sump (3). In order to improve the efficiency, at least one first characteristic operating parameter of the vehicle, according to the invention, is detected, and the control valve (7) is operated in dependence of at least said first characteristic operating parameter, wherein the vehicle speed (v) is selected as first characteristic operating parameter.

11 Claims, 2 Drawing Sheets

(56) References Cited

U.S. PATENT DOCUMENTS

| | | |
|---|---|---|
| 7,878,304 B2 | 2/2011 | Reis et al. |
| 8,997,934 B2 | 4/2015 | Nielsen |
| 2014/0190428 A1 | 7/2014 | Kikuchi et al. |
| 2016/0305538 A1* | 10/2016 | Doertoluk ........... F16H 57/0412 |

* cited by examiner

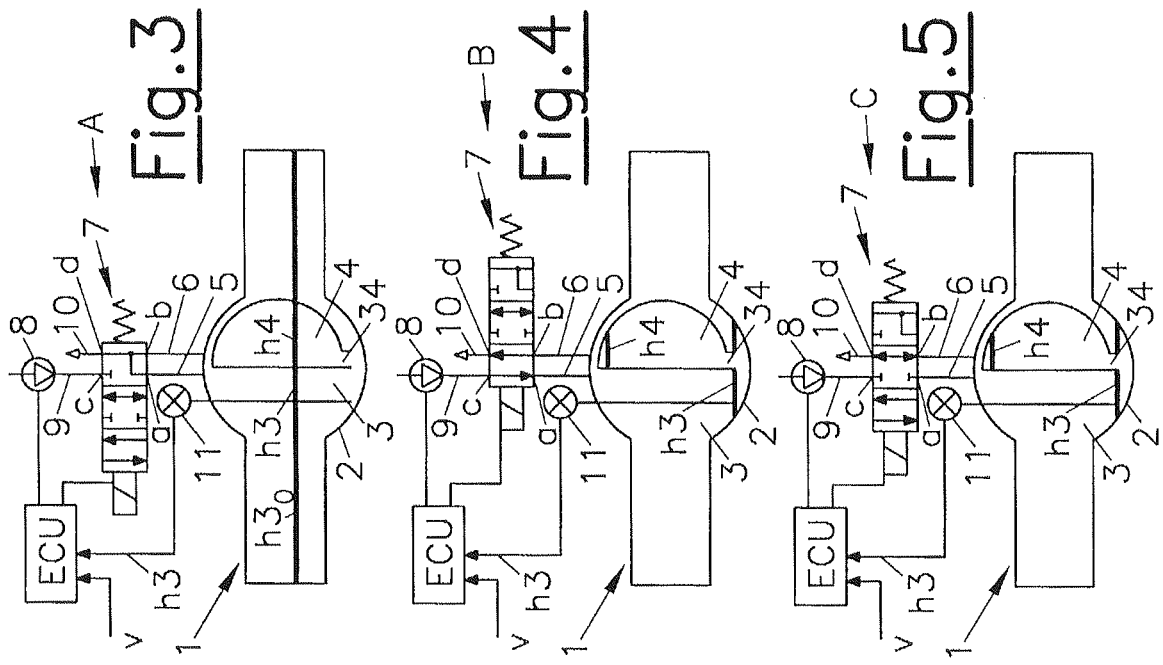
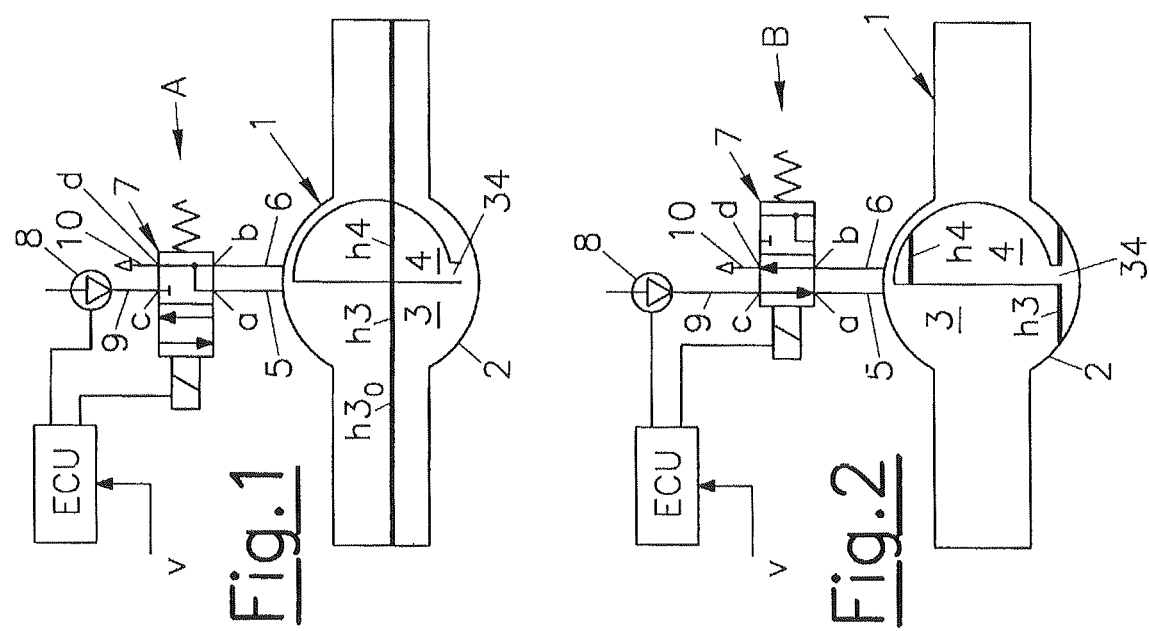

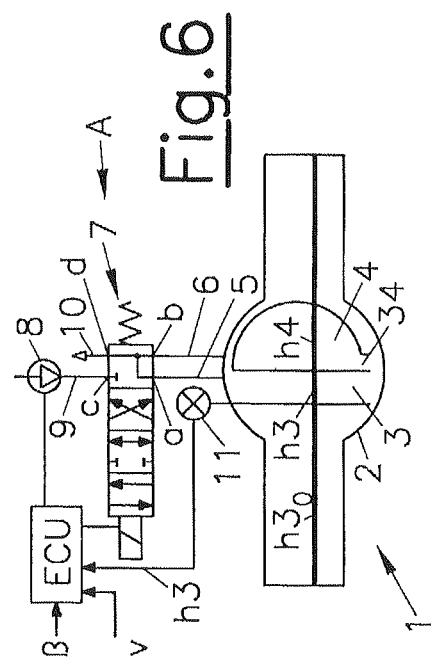
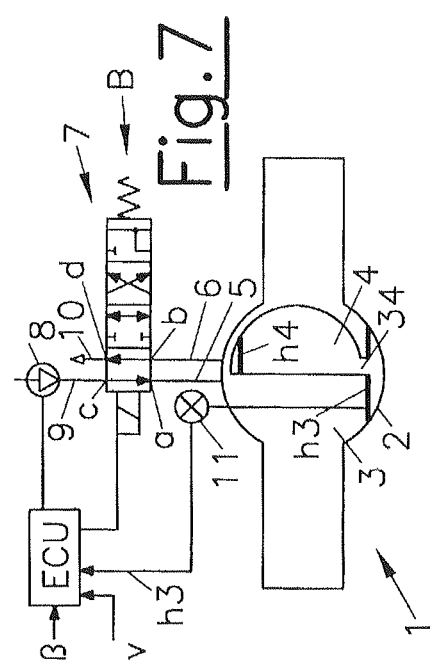
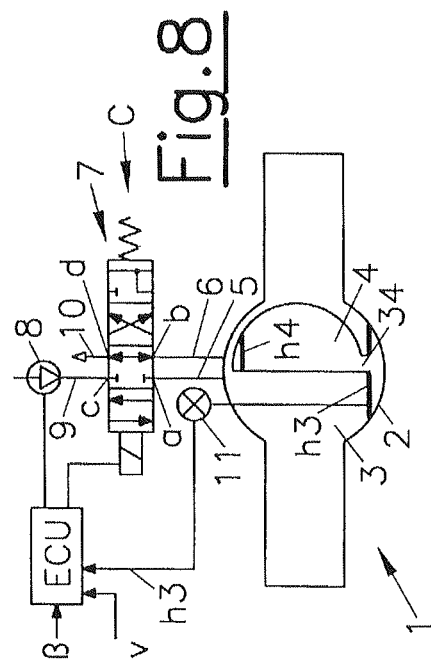
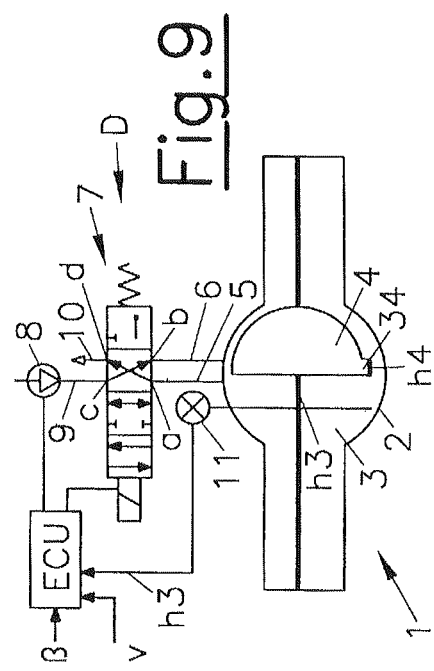

METHOD FOR CONTROLLING THE OIL LEVEL IN A GEARBOX, AND GEARBOX FOR CARRYING OUT SAID METHOD

The invention relates to a method for controlling the oil level in a differential gear for a vehicle having an oil sump and an oil reservoir separated from the oil sump, wherein the oil reservoir is connected via at least one oil channel to the oil sump, and the oil sump is connected via at least one control valve and an air line to a pneumatic pressure source, wherein in at least one position of the control valve, the pressure source is pneumatically connected to the oil sump. Furthermore, the invention relates to a differential gear for carrying out the method.

DE 10 2009 045 426 A1 describes an arrangement for balancing pressure and/or coolant levels in different housing parts of a transmission of a vehicle with a compressed air supply. Compressed air for displacing oil through at least one oil channel in a housing part with a lower oil level can be guided via the compressed air supply into a housing part with a higher oil level. The compressed air supply is arranged outside the housing and connected via at least one pneumatic line to one of the housing parts.

Furthermore, from EP 0 406 649 A1 a device for adjusting the oil level in a transmission is known, which contains at least two separate transmission housing chambers, which are partially filled with air and partly with oil, and between which oil exchange is possible. With an air pump, air is forced into a housing chamber in which there is a tendency for oil accumulation, so that oil is displaced from the first transmission housing chamber and pressed into a second transmission housing chamber.

WO 2008/108720 A1 discloses a lubricating device for a manual transmission of a vehicle, wherein the gearbox has in each case a separate oil compartment per pair of meshing gearwheels. The oil level of each oil compartment can be lowered or increased independently of the other oil compartments. In this case, the oil level of oil compartments whose pairs of gearwheels just transmit torque increases, while in oil compartments whose gearwheels are inactive the oil levels are lowered. The control of the oil levels is carried out depending on the load or the transmitted torque.

Especially at high vehicle speeds, large churning losses occur when the oil level is too high. In this case, a low oil level would be sufficient for adequate lubrication at high speeds and the resulting low torque on the transmission parts by the arising oil mist. On the other hand, a higher oil level is necessary at low vehicle speeds or low rotational speeds and the resulting higher torques on the transmission parts.

It is the object of the invention to increase the overall efficiency of the drive train and to simultaneously ensure adequate lubrication.

According to the invention, this object is achieved in that at least one first characteristic operating parameter is determined and that the control valve is actuated depending on at least said first characteristic operating parameter of the vehicle, wherein the vehicle speed is selected as the first characteristic operating parameter.

Preferably, the control valve is switched to the first position on reaching and/or above a defined first minimum value of the first characteristic operating parameter. Below the defined threshold value of the first characteristic operating parameter, the control valve is switched to a second position, in which the oil sump is pneumatically separated from the pressure source and connected to a pressure sink, preferably flow-connected to the environment.

It is particularly advantageous if a second characteristic operating parameter, e.g. the oil level in the oil sump, is determined and the control valve is actuated depending on this second characteristic operating parameter, wherein preferably the control valve is switched to a third position upon reaching or above a threshold value of the second characteristic operating parameter in which the oil sump is pneumatically separated from the pressure source and from the environment.

It is provided in a particularly preferred embodiment of the invention that the control valve is switched to a fourth position depending on at least one third characteristic operating parameter, e.g. the inclination of the vehicle, in which the oil reservoir is pneumatically connected to the pressure source, preferably the oil sump to the environment.

The oil level of the oil sump is thus controlled depending on the first characteristic operating parameter, e.g. the vehicle speed or the rotational speed of a characteristic transmission shaft, i.e. reduced at high vehicle speeds or rotational speeds and increased at low vehicle speeds or rotational speeds. The control of the oil level occurs for example via an electronic control unit, which is supplied with at least one characteristic operating parameter as an input variable. In this case, the input of the control unit can be connected to a sensor for detecting the vehicle speed or the rotational speed of a characteristic shaft of the differential gear. In addition, the oil level of the oil sump can be detected via another sensor and transmitted to the control unit as an input variable.

All embodiments of the invention have the main functionality that the oil level is lowered in the oil sump of the differential gear above a defined threshold for the vehicle speed or for the speed of a characteristic shaft of the differential gear and increased below this threshold.

At low vehicle speeds where low churning losses occur, a high oil level is set to ensure adequate lubrication of the gears and bearings. At higher vehicle speeds, on the other hand, a low oil level is set to avoid churning losses. At high vehicle speeds, lower maximum tractive forces occur, resulting in lower torques. This reduces the requirements placed on the lubrication. In addition, an oil mist forms within the housing at high speeds of the gear parts. Adequate lubrication of the gearwheels and bearings is thus achieved nevertheless.

The control of the oil level can also be carried out depending on other operating parameters, such as vehicle inclination, oil temperature, special driving conditions, etc. In order to make this possible, the control unit can be connected on the input side to other sensors, such as tilt sensors, temperature sensors or the like.

In a simple and inexpensive embodiment variant of the invention, it is provided that the control valve is formed as a 3/2-way valve or as a 4/2-way valve. In this case, the valve has three or four connections, wherein one connection is made to the pressure source, one connection to the oil sump, one connection to the environment and, in the case of the 4/2-way valve, one connection to the oil reservoir. When using a 3/2-way valve, a bleeder is additionally required, which permanently connects the oil reservoir to the environment. In the first position assigned to a standard oil level in the oil sump (rest position), both containers are connected to the environment and disconnected from the pressure source. In the second position, the pressure source is connected to the oil sump and the reservoir to the environment.

This embodiment allows the basic functions with a minimum amount of components. An oil level sensor is not required. However, intermediate positions in the oil level are difficult to realize. Furthermore, a permanent supply of compressed air is required to maintain the oil level. This can also lead to foaming of oil in this case. Without an oil level sensor, however, there is no feedback information when the standard oil level is reached.

A better controllability of the oil level and a higher functionality can be achieved if the control valve is designed as a 4/3-way valve. As with 4/2-way valves, the 4/3-way valve has four connections, wherein one connection is connected to the pressure source, one connection to the oil sump, one connection to the oil reservoir and one connection to the environment. In the first position (rest position) associated with a standard oil level in the oil sump, both reservoirs are connected to the environment and separated from the pressure source. The first position taken at low vehicle speeds allows a relatively high level of oil in the sump at standard level. In the second position, the pressure source is connected to the oil sump and the reservoir to the environment. This position is activated at high vehicle speeds in order to lower the oil level in the oil sump. Furthermore, a third position of the control valve is provided, in which the oil sump is pneumatically separated from the pressure source and from the environment, but kept under pressure. The oil reservoir can be connected in this case to the environment.

This makes it possible to also adjust intermediate positions in the oil level of the oil sump. The oil level can be kept constant in this case at any level of oil, without having to constantly actively readjust and blow compressed air into the housing of the differential gear. With an oil level sensor, the oil level in the oil sump can be monitored.

Even greater functionality can be achieved if the valve is designed as a 4/4-way valve. In addition to the functionality of the 4/3-way valve, the oil level in the sump can not only be actively lowered in relation to a standard level in the non-pressurized state, but also increased by injecting compressed air into the oil reservoir in one position of the valve. For this purpose, in addition to the first, second and third positions explained with respect to the 4/3-way valve, a fourth position is provided in which the oil reservoir is pneumatically connected to the pressure source and the oil sump to the environment. In this way, the pressure in the oil reservoir can be increased and the oil contained therein pressed into the oil sump, as a result of which the oil level in the oil sump can even be raised above the standard oil level in order to ensure sufficient lubrication even under extreme driving conditions. The oil reservoir can be completely emptied even in an arrangement within the housing of the differential gear. Once the required oil level is reached, the control valve is moved to the third position to maintain the oil level. The switching to the fourth position can occur due to a further operating parameter, such as the inclination of the vehicle.

The invention will be explained in more detail below with reference to the non-limiting figures, which schematically show the following:

FIG. 1 shows a differential gear according to the invention in a first embodiment in a first position of the control valve;

FIG. 2 shows a differential gear according to the invention in a first embodiment in a second position of the control valve;

FIG. 3 shows a differential gear according to the invention in a second embodiment in a first position of the control valve;

FIG. 4 shows a differential gear according to the invention in a second embodiment in a second position of the control valve;

FIG. 5 shows a differential gear according to the invention in a second embodiment in a third position of the control valve;

FIG. 6 shows a differential gear according to the invention in a third embodiment in a first position of the control valve;

FIG. 7 shows a differential gear according to the invention in a third embodiment in a second position of the control valve;

FIG. 8 shows a differential gear according to the invention in a third embodiment in a third position of the control valve, and FIG. 9 shows a differential gear according to the invention in a third embodiment in a fourth position of the control valve.

The drawings each show a differential gear 1 of a vehicle, wherein two pneumatically separated compartments, namely an oil sump 3 and an oil reservoir 4, which are hydraulically connected to each other via at least one oil channel 34, are arranged within the housing 2 of the differential gear 1. A first air line 5 opens into the oil sump 3 and a second air line 6 into the oil reservoir 4, wherein the flow through the air lines 5, 6 can be controlled by means of a control valve 7. The control of the control valve 7 occurs via an electronic control unit ECU, which receives at least one characteristic operating parameter, e.g. the vehicle speed v, as an input variable. The control valve 7 is designed in each case as a multi-way valve, wherein a first connection a is connected to the first air line 5, a second connection b to the second air line 6, a third connection c to a pressure line 9 leading to a pressure source 8, and a fourth connection d to a relief line 10 leading into the environment. The pressure source can be formed for example by an air pump. The oil level in the oil sump 3 is indicated by the reference numeral h3 and the oil level in the oil reservoir 4 by the reference numeral h4.

All variants of the invention have the main functionality that the oil level h3 is lowered in the oil sump 3 of the differential gear 1 above a defined threshold for the vehicle speed v or for the speed of a characteristic shaft of the differential gear 1 and increased below this threshold. At low vehicle speeds v, in which only slight churning losses occur, a high oil level h3 is set in the oil sump 3 to ensure adequate lubrication of the gearwheels and bearings of the differential gear 1. At higher vehicle speeds v, on the other hand, a low oil level h3 is set in the oil sump in order to avoid churning losses. At high vehicle speeds, lower maximum tractive forces occur and, as a result, lower maximum torques. This reduces the requirements for lubrication. In addition, an oil mist forms within the housing at high speeds of the gear parts. Sufficient lubrication of the gears and bearings is thus still ensured.

The control of the oil level h3 in the oil sump 3 can be carried out in addition to the vehicle speed v depending on other operating parameters, such as vehicle inclination, oil temperature, special driving conditions, etc. Such influences can be considered above all with the second and third embodiment variants, wherein the control unit ECU can be connected on the input side to other sensors such as inclination sensors, temperature sensors or the like.

FIGS. 1 and 2 show a simple first embodiment variant of the invention, in which the switching valve 7 is designed as a 4/2-way valve.

In the first position A (rest position) of the control valve 7 shown in FIG. 1, both compartments, i.e. both the oil sump 3 and the oil reservoir 4, are connected to the environment and separated from the pressure source 8. The first position A is assigned to a standard oil level $h3_0$ in the oil sump 3. In the second position B shown in FIG. 2, the pressure source 8 is connected to the oil sump 3 and the oil reservoir 4 to the environment.

The embodiment variant shown in FIG. 1 and FIG. 2 allows the basic functions with a minimum amount of components. An oil level sensor is not essential.

Higher functionality can be achieved with the second and third embodiment variants described below:

FIGS. 3 to 5 show a second embodiment variant of the invention, in which the control valve 7 is designed as a 4/3-way valve. As in the first embodiment, a first position A and a second position B can be controlled, wherein in the first position A shown in FIG. 3 (rest position) of the control valve 7, the two compartments, i.e. both the oil sump 3 and the oil reservoir 4, are connected to the environment and separated from the pressure source 8. In the second position B shown in FIG. 4, the pressure source 8 is connected to the oil sump 3 and the oil reservoir 4 to the environment. In addition to the first position A and to the second position B, a third position C can be triggered, as shown in FIG. 5. In this third position C of the control valve 7, the oil sump 3 is pneumatically separated from the pressure source 8 and from the environment, but is maintained at pressure. The oil reservoir 4 must be connected to the environment. This makes it possible to set even intermediate positions in the oil level h3 of the oil sump 3. Each adjustable oil level h3 of the oil sump 3 can be kept constant in this case, without having to actively continuously readjust and blow compressed air into the housing 2 of the differential gear 1. With an oil level sensor 11, the oil level h3 in the oil sump 3 can be monitored. And every intermediate position of the oil level h3 can be set depending on the oil level h3.

FIGS. 6 to 9 show a third embodiment variant of the invention, in which the control valve 7 is designed as a 4/4-way valve. As in the second embodiment, a first position A, second position B and a third position C can be controlled, wherein in the first position A shown in FIG. 6 (rest position) of the control valve 7, the two compartments, i.e. both the oil sump 3 and the oil reservoir 4, are connected to the environment and are separated from the pressure source 8. In the second position B shown in FIG. 7, the pressure source 8 is connected to the oil sump 3 and the oil reservoir 4 to the environment. In the third position shown in FIG. 8, the oil sump 3 is pneumatically separated from the pressure source 8 and from the environment, but is kept under pressure to maintain a set oil level h3 in the oil sump. In addition to the first A, second B and third positions C explained with respect to the 4/3-way valve, a fourth position D is further provided in which the oil reservoir 4 is pneumatically connected to the pressure source 8 and the oil sump 3 to the environment. In this way, the pressure in the oil reservoir 4 can be increased and the oil contained therein is pressed into the oil sump 3, as a result of which the oil level h3 in the oil sump 3 can even be raised above the standard oil level $h3_0$ to ensure adequate lubrication even under extreme driving conditions. Extreme driving situations can be determined on the basis of third operating parameters supplied to the control unit ECU, e.g. inclination information β of the vehicle detected by an inclination sensor. In the fourth position D of the control valve 7, it is possible to empty the oil reservoir 4 completely. As soon as the required oil level h3 of the oil sump 3 is reached, the control valve 7 is again moved to the third position C in order to maintain the oil level h3.

With each of the described embodiment variants, losses in the drive train can be reduced and adequate lubrication of the differential gear 1 can be ensured.

The invention claimed is:

1. A method for controlling the oil level in a differential gear for a vehicle having an oil sump and an oil reservoir pneumatically separated from the oil sump,
   wherein the oil reservoir is connected via at least one oil channel to the oil sump, and the oil sump is connected via at least one control valve and an air line to a pneumatic pressure source,
   wherein in at least one position of the control valve pressure source is pneumatically connected to the oil sump, wherein at least one first characteristic operating parameter of vehicle is determined and that the control valve is actuated depending on at least said first characteristic operating parameter, wherein the vehicle speed is selected as the first characteristic operating parameter, and
   wherein at low vehicle speeds a high oil level is set and at higher vehicle speeds a lower oil level is set, wherein the control valve upon reaching and/or above a defined threshold of the first characteristic operating parameter is switched from a first position assigned to a standard oil level in the oil sump to a second position in which the oil sump is pneumatically connected to the pressure source, and wherein the oil reservoir is flow-connected to a pressure sink when in the second position.

2. The method according to claim 1, wherein the control valve is switched below the defined threshold value of the first characteristic operating parameter to the first position, in which the oil sump is pneumatically separated from the pressure source and pneumatically connected to the pressure sink.

3. The method according to claim 2, wherein the pressure sink is formed by an environment.

4. The method according to claim 1, wherein a second characteristic operating parameter is determined and the control valve is actuated depending on this second characteristic operating parameter.

5. The method according to claim 4, wherein the oil level in the sump is selected as a second characteristic operating parameter.

6. The method according to claim 4, wherein the control valve upon reaching or above a threshold value of the second characteristic operating parameter is switched to a third position, in which the oil sump is pneumatically separated from the pressure source and from a pressure-sink.

7. The method according to claim 6, wherein the pressure sink is formed by an environment.

8. The method according to claim 1, wherein the pressure sink is formed by an environment.

9. A differential gear for a vehicle, which has an oil sump and an oil reservoir pneumatically separated from the oil sump,
   wherein the oil reservoir is hydraulically connected via at least one oil channel to the oil sump, and the oil sump is connectable via at least one control valve and an air line to a pneumatic pressure source,
   wherein at least one position of the control valve the pressure source is pneumatically connected to the oil sump, wherein the control valve can be actuated depending on at least one first characteristic operating parameter of the vehicle formed by the vehicle speed,
   wherein the control valve upon reaching and/or above a defined threshold of the first characteristic operating parameter can be switched from a first position associated with a standard oil level in the oil sump to a second position, and that below the defined threshold value of the first characteristic operating parameter the control valve can be switched to the first position in which the oil sump is pneumatically separated from the pressure source and flow-connected to a pressure sink.

10. The differential gear according to claim 9, wherein upon reaching or above a threshold value of a second characteristic operating parameter the control valve can be switched to a third position, in which the oil sump is pneumatically separated from the pressure source and from the pressure sink.

11. The differential gear according to claim 9, wherein the pressure sink is formed by an environment.

* * * * *